United States Patent
Goto

(10) Patent No.: US 11,331,675 B2
(45) Date of Patent: May 17, 2022

(54) METHOD FOR PRODUCING GRANULATED PARTICLES FOR ELECTROCHEMICAL DEVICE, ELECTRODE FOR ELECTROCHEMICAL DEVICE, AND ELECTROCHEMICAL DEVICE

(71) Applicant: ZEON CORPORATION, Tokyo (JP)

(72) Inventor: Nobuyuki Goto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 874 days.

(21) Appl. No.: 14/900,393

(22) PCT Filed: Aug. 19, 2014

(86) PCT No.: PCT/JP2014/071597
§ 371 (c)(1),
(2) Date: Dec. 21, 2015

(87) PCT Pub. No.: WO2015/029829
PCT Pub. Date: Mar. 5, 2015

(65) Prior Publication Data
US 2016/0181023 A1 Jun. 23, 2016

(30) Foreign Application Priority Data

Aug. 26, 2013 (JP) .............................. JP2013-174356

(51) Int. Cl.
*B02C 17/16* (2006.01)
*H01M 4/139* (2010.01)
*H01M 4/04* (2006.01)
*H01M 10/0525* (2010.01)
(Continued)

(52) U.S. Cl.
CPC .............. *B02C 23/36* (2013.01); *B02C 17/16* (2013.01); *B02C 23/00* (2013.01); *B02C 23/06* (2013.01);
(Continued)

(58) Field of Classification Search
CPC ...... H01M 4/621; H01M 4/622; H01M 4/623; H01M 4/362; H01M 4/364; H01M 4/366;
(Continued)

(56) References Cited

U.S. PATENT DOCUMENTS

| 7,354,533 B2* | 4/2008 | Yeager | C08G 65/485 |
| | | | 252/500 |
| 7,567,429 B2* | 7/2009 | Mori | H01G 11/38 |
| | | | 361/502 |

(Continued)

FOREIGN PATENT DOCUMENTS

| JP | 2005-276609 A | 10/2005 |
| JP | 2009-146801 A | 7/2009 |
| JP | 5098192 B2 | 12/2012 |

OTHER PUBLICATIONS

International Search Report—PCT/JP2014/071597 dated Nov. 11, 2014.
(Continued)

*Primary Examiner* — Elaine Gort
*Assistant Examiner* — Christopher B Wehrly
(74) *Attorney, Agent, or Firm* — Studebaker & Brackett PC

(57) ABSTRACT

A step of obtaining a mixture by adding 0.3 parts by weight to 10 parts by weight of a particulate binder dispersion, which has a solid content concentration of 20% by weight to 60% by weight in terms of a solid content, to 100 parts by weight of an electrode active material; a kneading step of stirring the mixture by a kneading blade to obtain a uniformly dispersed mixture; a crushing step of crushing the uniformly dispersed mixture by a crushing blade to obtain granulated particles; and a drying step of drying the granulated particles are included.

12 Claims, 2 Drawing Sheets

(51) Int. Cl.
*B02C 23/36* (2006.01)
*B02C 23/00* (2006.01)
*B02C 23/06* (2006.01)
*B02C 23/38* (2006.01)
*H01M 4/62* (2006.01)
*H01M 4/485* (2010.01)
*H01G 11/42* (2013.01)
*H01G 11/86* (2013.01)

(52) U.S. Cl.
CPC ............ *B02C 23/38* (2013.01); *H01G 11/42* (2013.01); *H01G 11/86* (2013.01); *H01M 4/0416* (2013.01); *H01M 4/139* (2013.01); *H01M 4/485* (2013.01); *H01M 4/621* (2013.01); *H01M 10/0525* (2013.01); *Y02E 60/13* (2013.01); *Y02T 10/70* (2013.01)

(58) Field of Classification Search
CPC .. H01M 4/0404; H01M 4/043; H01M 4/0433; H01M 4/0435; B02C 23/00; B02C 23/06; B02C 23/16; B02C 17/08; B02C 17/16; B01F 2013/1086
USPC ..... 241/46.17, 199.12, 172, 17, 23, 65, 118; 366/288, 287
See application file for complete search history.

(56) References Cited

U.S. PATENT DOCUMENTS

| | | | |
|---|---|---|---|
| 8,616,763 B2* | 12/2013 | Annis | B01F 7/30 366/312 |
| 2005/0285080 A1 | 12/2005 | Suzuki et al. | |
| 2008/0099732 A1* | 5/2008 | Nagao | C08J 5/042 252/511 |
| 2009/0135666 A1* | 5/2009 | Watano | B02C 18/00 366/98 |
| 2009/0256014 A1* | 10/2009 | Amita | H01G 9/042 241/17 |
| 2015/0303465 A1* | 10/2015 | Watanabe | H01M 4/134 429/217 |
| 2016/0099461 A1* | 4/2016 | Kishimoto | H01M 4/04 366/69 |

OTHER PUBLICATIONS

International Preliminary Report on Patentability (Chapter I) and Translation of Written Opinion of the International Searching Authority; PCT/JP2014/071597 dated Mar. 1, 2016.

* cited by examiner

METHOD FOR PRODUCING GRANULATED PARTICLES FOR ELECTROCHEMICAL DEVICE, ELECTRODE FOR ELECTROCHEMICAL DEVICE, AND ELECTROCHEMICAL DEVICE

TECHNICAL FIELD

The present invention relates to a method for producing granulated particles for an electrochemical device, an electrode for an electrochemical device, and an electrochemical device.

BACKGROUND ART

An electrochemical device such as a lithium ion secondary battery, an electric double layer capacitor, or a lithium ion capacitor, which is compact and lightweight, has high energy density, and is further capable of repeatedly charging and discharging, has rapidly expanded the demand by utilizing the characteristics. The lithium ion secondary battery is used in a mobile field such as a mobile phone or a notebook personal computer, as it has a relatively high energy density. Meanwhile, the electric double layer capacitor is used as a small memory backup power supply for a personal computer or the like, as it can be charged and discharged rapidly. In addition, the electric double layer capacitor is expected to be applied as an auxiliary power supply for an electric vehicle or the like. Furthermore, the lithium ion capacitor taking advantages of the lithium ion secondary battery and the electric double layer capacitor is considered for applying to a use to which the electric double layer capacitor is applied and a use the specifications of which the electric double layer capacitor cannot satisfy, as it has a higher energy density and a higher output density than the electric double layer capacitor. Among these electrochemical devices, particularly in the lithium ion secondary battery, not only an application thereof to an in-vehicle use for a hybrid electric vehicle, an electric vehicle, or the like but also an application thereof to a power storage use has been considered recently.

While an expectation for these electrochemical devices is high, further improvement in the electrochemical devices, such as lowering resistance, increasing capacity, or improving mechanical characteristics and productivity is desired with expansion and development of the uses. In these circumstances, a more productive method for manufacturing an electrode for an electrochemical device is desired. Various improvements have been performed to a manufacturing method capable of high-speed molding and a material for the electrode for an electrochemical device suitable for the manufacturing method.

The electrode for an electrochemical device is usually obtained by laminating the electrode active material layer that has been formed by binding an electrode active material and an electroconductive agent used as needed with a binder on a current collector. The electrode for an electrochemical device is produced by a method in which a slurry composition containing an electrode active material, a binder, an electroconductive agent, and the like is applied onto a current collector, and a solvent is removed by heat or the like, however, the production of the uniform electrochemical device has tended to be difficult by migration of the binder or the like. Further, there has been a tendency in this method that the cost becomes high, the working environment deteriorates, and the size of a production apparatus increases.

On the other hand, a method for obtaining a uniform electrochemical device by obtaining granulated particles and powder-molding thereof is proposed. As a method for forming such an electrode active material layer, for example, Patent Literature 1 discloses that granulated particles having a cavity are prepared by spray-drying a slurry containing an electrode active material and a binder, and a slurry obtained by further mixing a binder to the granulated particles and an electroconductive agent is applied onto a current collector and dried.

Further, Patent Literature 2 discloses that a powder composed of graphite fluoride, a powdery electroconductive agent, a binder, and a carbon material in an aggregate form is subjected to pressure compression molding, and a positive electrode is prepared.

Further, Patent Literature 3 discloses that granulated particles are prepared by a fluidized bed granulation method in which a raw material liquid containing a binder, an electroconductive agent and a solvent is charged into an electrode active material formed into a fluid bed, and an electrode is formed by using the granulated particles.

CITATION LIST

Patent Literature

Patent Literature 1: JP 5098192 B2
Patent Literature 2: JP 2009-146801 A
Patent Literature 3: JP 2005-276609 A

SUMMARY OF INVENTION

Technical Problem

Here, in Patent Literature 1, because a slurry having a large water content is spray-dried, the size of the apparatus becomes large, and further because a binder and an electroconductive agent are migrated onto the surfaces of granulated particles during the spray-drying, it has been difficult to obtain uniform granulated particles. Further, the characteristics of an electrochemical device to be obtained have been lowered. Furthermore, in Patent Literature 2, because the fluidity of a powder is not sufficient, it has been difficult to prepare a long electrode. Moreover, the moldability of an electrode has been poor in the granulated particles in patent literature 3.

An object of the present invention is to provide a method for producing granulated particles for an electrochemical device, which are uniform, and excellent in the moldability of an electrode, and an electrode for an electrochemical device and an electrochemical device, which use the granulated particles for an electrochemical device.

Solution to Problem

As a result of intensive studies, the present inventor has found that the above object can be achieved by stirring an electrode active material and a binder, and then crushing the resultant mixture, and thus have completed the present invention.

That is, according to the present invention,
(1) a method for producing granulated particles for an electrochemical device, including: a step of obtaining a mixture by adding 0.3 parts by weight to 10 parts by weight of a particulate binder dispersion, which has a solid content concentration of 20% by weight to 60% by weight in terms of a solid content, to 100 parts by weight of an electrode active material; a kneading step of stirring the mixture by a kneading blade to obtain a uniformly dispersed mixture; a crushing step of crushing the uniformly dispersed mixture by a crushing blade to obtain granulated particles; and a drying step of drying the granulated particles;

(2) the method for producing granulated particles for an electrochemical device described in (1), in which a dispersion medium is added in the kneading step and/or the crushing step;

(3) the method for producing granulated particles for an electrochemical device described in (1) or (2), in which a granulator equipped with a kneading blade, a crushing blade, and a scraper is used in the crushing step;

(4) the method for producing granulated particles for an electrochemical device described in any one of (1) to (3), in which a volume average particle diameter D50 of the granulated particles for an electrochemical device to be obtained is from 10 µm to 350 µm;

(5) an electrode for an electrochemical device obtained by dry molding the granulated particles for an electrochemical device to be obtained by the method for producing granulated particles for an electrochemical device described in any one of (1) to (4); and (6) an electrochemical device, containing the electrode for an electrochemical device described in (5); are provided.

Advantageous Effects of Invention

According to the method for producing granulated particles for an electrochemical device of the present invention, granulated particles for an electrochemical device, which are uniform, and excellent in the moldability of an electrode, can be produced. Further, according to the present invention, an electrode for an electrochemical device and an electrochemical device, which use the granulated particles for an electrochemical device produced by the method for producing granulated particles for an electrochemical device of the present invention, can be provided.

DESCRIPTION OF EMBODIMENTS

Figure 1:
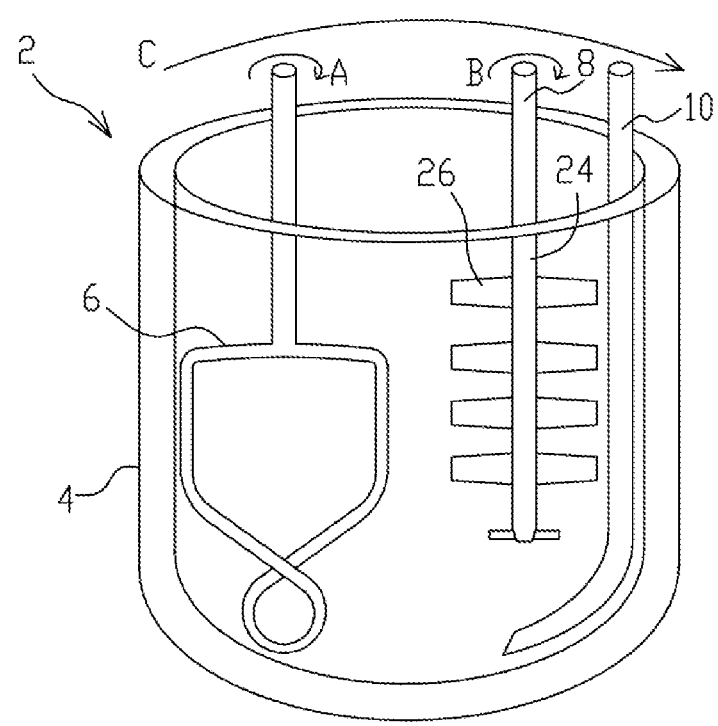
FIG. 1 is a drawing showing a main part of a granulator used in the present invention.

Hereinafter, a method for producing granulated particles for an electrochemical device of the present invention will be explained with reference to drawings. A method for producing granulated particles for an electrochemical device of the present invention includes: a step of obtaining a mixture by adding 0.3 parts by weight to 10 parts by weight of a particulate binder dispersion, which has a solid content concentration of 20% by weight to 60% by weight in terms of a solid content, to 100 parts by weight of an electrode active material; a kneading step of stirring the mixture by a kneading blade to obtain a uniformly dispersed mixture; a crushing step of crushing the uniformly dispersed mixture by a crushing blade to obtain granulated particles; and a drying step of drying the granulated particles.

(Electrode Active Material)

The electrode active material used in the present invention is appropriately selected depending on the type of the electrode for an electrochemical device to be produced. For example, in a case where the electrode for an electrochemical device to be produced is a positive electrode for a lithium ion secondary battery, examples of a positive electrode active material include a metal oxide capable of reversibly doping and dedoping lithium ions. Examples of the metal oxide include, for example, a lithium cobaltate, a lithium nickelate, a lithium manganate, a lithium iron phosphate, a lithium manganese phosphate, a lithium vanadium phosphate, a lithium iron vanadate, a lithium nickel-manganese-cobaltate, a lithium nickel-cobaltate, a lithium nickel-manganate, a lithium iron-manganate, a lithium iron-manganese-cobaltate, a lithium iron silicate, a lithium manganese-iron silicate, a vanacium oxide, a copper vanadate, a niobium oxide, a titanium sulfide, a molybdenum oxide, and a molybdenum sulphide. Note that, the positive electrode active material mentioned in the above may be used alone, or may also be used by mixing a plurality of kinds thereof appropriately depending on the application. Further, the examples include a polymer such as polyacetylene, poly-p-phenylene, and polyquinone. Among them, a lithium-containing metal oxide such as a lithium cobaltate is preferably used.

Here, the dope in the present invention means occlusion, support, adsorption, or insertion, and is defined as a phenomenon in which a lithium ion and/or anion enters a positive electrode, or a phenomenon in which a lithium ion enters a negative electrode. Further, the dedope means release, desorption, and separation, and is defined as a reverse phenomenon of the above-described dope.

Further, in a case where the electrode for an electrochemical device to be produced is a negative electrode as a counter electrode to the positive electrode for the above-described lithium ion secondary battery, examples of a negative electrode active material include low crystalline carbon (amorphous carbon) such as easily graphitizable carbon, hardly graphitizable carbon, activated carbon, and pyrolytic carbon, graphite (natural graphite, artificial graphite), carbon nano wall, carbon nano tube, or a composite carbon material of these carbons with different physical properties, an alloy-base material of tin, silicon, or the like, an oxide such as a silicon oxide, a tin oxide, a vanadium oxide, and a lithium titanate, and polyacene. Among them, a silicon-based active material such as silicon and a silicon compound, or graphite is preferably used. Note that, the electrode active material mentioned in the above may be used alone, or may also be used by mixing a plurality of kinds thereof appropriately depending on the application.

As the shape of the electrode active material for the electrode for a lithium ion secondary battery, the one granulated to a granular shape is preferred. When the shape of the particle is a spherical shape, an electrode having a higher density can be formed at the time of molding the electrode. Further, the volume average particle diameter of the positive electrode active material and the negative electrode active material for a lithium ion secondary battery is preferably 0.1 to 100 µm, more preferably 0.5 to 50 µm, and furthermore preferably 0.8 to 20 µm in both of the positive electrode and the negative electrode. In addition, the tap density of the positive electrode active material and the negative electrode active material for a lithium ion secondary battery is not particularly limited, however, the one having a tap density of 2 $g/cm^3$ or more in the positive electrode, and the one having a tap density of 0.6 $g/cm^3$ or more in the negative electrode are preferably used.

Alternatively, in a case where the electrode for an electrochemical device to be produced is a positive electrode for a lithium ion capacitor, examples of the active material for a positive electrode include activated carbon capable of reversibly doping and dedoping anions and/or cations, a polyacene-based organic semiconductor (PAS), carbon nano tube, a carbon whisker, and graphite. Among them, activated carbon, and carbon nano tube are preferred.

Further, in a case where the electrode for an electrochemical device to be produced is a negative electrode as a counter electrode to the positive electrode for the above-described lithium ion capacitor, as the negative electrode active material, any of the materials mentioned as a negative electrode active material for a lithium ion secondary battery can be used.

The volume average particle diameter of the positive electrode active material and the negative electrode active material for a lithium ion capacitor is preferably 0.1 to 100 µm, more preferably 0.5 to 50 µm, and furthermore preferably 0.8 to 20 µm. Further, in a case where activated carbon is used as a positive electrode active material for a lithium ion capacitor, the specific surface area of the activated carbon is 30 $m^2/g$ or more, preferably 500 to 3,000 $m^2/g$, and more preferably 1,500 to 2,600 $m^2/g$. When the specific surface area is up to around 2,000 $m^2/g$, as the specific surface area larger, the capacitance per unit weight of the activated carbon tends to increase, however, when the specific surface area is larger than 2,000 $m^2/g$, the capacitance does not increase so much, on the contrary, a density of the electrode active material layer decreases and a density of the capacitance tends to decrease. Further, it is preferred that a size of a pore in activated carbon is suitable for the size of an electrolyte ion from the viewpoint of the rapid charge/discharge characteristics that are features as a lithium ion capacitor. Therefore, an electrode active material layer having an intended capacitance density and input/output characteristics can be obtained by appropriately selecting the electrode active material.

Further, in a case where the electrode for an electrochemical device to be produced is a positive electrode or a negative electrode for an electric double-layered capacitor, as the positive electrode active material and the negative electrode active material, any of the materials mentioned as the positive electrode active material for the above-described lithium ion capacitor can be used.

(Particulate Binder Dispersion)

The particulate binder dispersion used in the present invention is the one in which a particulate binder is dispersed in a dispersion medium such as water. The particulate binder is not particularly limited as long as being a compound capable of binding the electrode active materials to each other, however, a dispersion type particulate binder having a nature of dispersing in a solvent is preferred in the present invention. Examples of the dispersion type particulate binder include, for example, a silicon-based polymer, a fluorine-containing polymer, a conjugated diene-based polymer, an acrylate-based polymer, and a polymer compound such as polyimide, polyamide, and polyurethane, among them, preferably a fluorine-based-containing polymer, a conjugated diene-based polymer and an acrylate-based polymer, and more preferably a conjugated diene-based polymer and an acrylate-based polymer.

The conjugated diene-based polymer is a copolymer obtained by polymerizing a homopolymer of conjugated diene or a monomer mixture containing conjugated diene, or a hydrogenated product thereof. The ratio of the conjugated diene in the monomer mixture is preferably 40% by weight or more, more preferably 50% by weight or more, and furthermore preferably 60% by weight or more. Specific examples of the conjugated diene-based polymer include a conjugated diene homopolymer such as polybutadiene and polyisoprene; an aromatic vinyl-conjugated diene copolymer such as a styrene-butadiene copolymer (SBR), which may be carboxy-modified; a vinyl cyanide-conjugated diene copolymer such as an acrylonitrile-butadiene copolymer (NBR); and hydrogenated SBR, and hydrogenated NBR.

The acrylate-based polymer is a polymer containing a monomeric unit derived from a compound represented by general formula (1): $CH_2=CR^1-COOR^2$ (where $R^1$ represents a hydrogen atom or a methyl group and $R^2$ represents an alkyl group or a cycloalkyl group. $R^2$ may further contain an ether group, a hydroxyl group, a carboxylic acid group, a fluorine group, a phosphate group, an epoxy group, and an amino group), and is specifically a homopolymer obtained by polymerizing a compound represented by general formula (1) or a copolymer obtained by polymerizing a monomer mixture containing a compound represented by general formula (1). Specific examples of the compound represented by general formula (1) include a (meth)acrylic acid alkyl ester such as a methyl (meth)acrylate, an ethyl (meth)acrylate, a propyl (meth)acrylate, an isopropyl (meth)acrylate, a n-butyl (meth)acrylate, an isobutyl (meth)acrylate, a cyclohexyl (meth)acrylate, a 2-ethylhexyl (meth)acrylate, an isopentyl (meth)acrylate, an isooctyl (meth)acrylate, an isobonyl (meth)acrylate, an isodecyl (meth)acrylate, a lauryl (meth)acrylate, a stearyl (meth)acrylate, and a tridecyl (meth)acrylate; an ether group-containing (meth)acrylic ester such as a butoxyethyl (meth)acrylate, an ethoxydiethylene glycol (meth)acrylate, a methyoxydipropylene glycol (meth)acrylate, a methyoxypolyethylene glycol (meth)acrylate, a phenoxyethyl (meth)acrylate, and a tetrahydrofurfuryl (meth)acrylate; a hydroxyl group-containing (meth)acrylic ester such as a 2-hydroxyethyl (meth)acrylate, a 2-hydroxypropyl (meth) acrylate, a 2-hydroxy-3-phenoxypropyl (meth) acrylate, and a 2-(meth) acryloyloxyethyl-2-hydroxyethyl phthalate; a carboxylic acid-containing (meth)acrylic ester such as a 2-(meth)acryloyloxyethyl phthalate, and a 2-(meth) acryloyloxyethyl phthalate; a fluorine group-containing (meth)acrylic ester such as a perfluorooctyl ethyl (meth)acrylate; a phosphate group-containing (meth)acrylic ester such as an ethyl phosphite (meth)acrylate; an epoxy group-containing (meth)acrylic ester such as a glycidyl (meth)acrylate; and an amino group-containing (meth) acrylic ester such as a dimethylaminoethyl (meth)acrylate.

These (meth)acrylic acid esters can be used alone or in combination of two or more kinds thereof. Among them, a (meth)acrylic acid alkyl ester is preferred, and a methyl (meth)acrylate, an ethyl (meth)acrylate, a n-butyl (meth) acrylate, and a (meth)acrylic acid alkyl ester in which the alkyl group has 6 to 12 carbon atoms are more preferred. By selecting these, swelling for the electrolytic solution can be reduced, and cycle characteristics can be improved.

Further, the acrylate-based polymer, for example, can also copolymerize a copolymerizable monomer, such as carboxylic acid esters having two or more carbon-carbon double bonds, an aromatic vinyl-based monomer, an amide-based monomer, olefins, a diene-based monomer, vinyl ketones, and a heterocyclic ring-containing vinyl compound. Furthermore, it can also copolymerize an α,β-unsaturated nitrile compound, or a vinyl compound having an acid component.

A content ratio of a (meth)acrylic acid ester unit in the acrylate-based polymer is preferably 50 to 95% by weight, and more preferably 60 to 90% by weight from the viewpoints that the flexibility of the resulting electrode for an electrochemical device can be improved, and the resistance to cracking is increased.

Further, the acrylate-based polymer may be a copolymer of the above-described (meth)acrylic acid ester and a monomer copolymerizable with this ester, and examples of such a copolymerizable monomer include, for example, an α,β-unsaturated nitrile compound, and a vinyl compound having an acid component.

Examples of the α,β-unsaturated nitrile compound include acrylonitrile, methacrylonitrile, α-chloro acrylonitrile, and α-bromoacrylonitrile. These can be used alone or in combination of two or more kinds thereof. Among them, acrylonitrile and methacrylonitrile are preferred, and acrylonitrile is more preferred.

A content ratio of an α,β-unsaturated nitrile compound unit in the acrylate-based polymer is preferably 0.1 to 40% by weight, more preferably 0.5 to 30% by weight, and furthermore preferably 1 to 20% by weight, from the viewpoint of further enhancing the binding strength as a binder.

Further, examples of the vinyl compound having an acid component include acrylic acid, methacrylic acid, itaconic acid, maleic acid, and fumaric acid. These can be used alone or in combination of two or more kinds thereof. Among them, acrylic acid, methacrylic acid, and itaconic acid are preferred, and itaconic acid is more preferred.

A content ratio of a vinyl compound unit having an acid component in the acrylate-based polymer is preferably 1 to 10% by weight, and more preferably 1.5 to 5.0% by weight, from the viewpoint of improving stability in the form of an aqueous slurry composition.

Further, the acrylate-based polymer may be obtained by copolymerizing each of the above-described monomers and another copolymerizable monomer, and examples of such another monomer include, for example, carboxylic acid esters having two or more carbon-carbon double bonds, an aromatic vinyl-based monomer, an amide-based monomer, olefins, a diene-based monomer, vinyl ketones, and a heterocyclic ring-containing vinyl compound.

The solid content concentration of the particulate binder dispersion in the present invention is 20 to 60% by weight, preferably 20 to 55% by weight, and more preferably 25 to 55% by weight, from the viewpoint of making the uniformity of the uniformly dispersed mixture described below sufficient. When the solid content concentration of the particulate binder dispersion is too low or too high, uniformity of the uniformly dispersed mixture cannot be sufficient.

The dispersion type particulate binder used in the present invention is particulate, therefore, the binding properties are favorable, and it is possible to suppress reduction in a capacity of a prepared electrode and deterioration of the electrode due to the repetition of charging and discharging. Examples of the particulate binder include, for example, the one in a state that a particulate binder is dispersed in water, such as latex.

The volume average particle diameter of the dispersion type particulate binder used in the present invention is preferably 0.001 to 100 μm, more preferably 10 to 1000 nm, and furthermore preferably 50 to 500 nm from the viewpoint that the strength and flexibility of the resulting electrode for an electrochemical device become favorable.

The content of a particulate binder is 0.3 to 10 parts by weight, preferably 0.3 to 8 parts by weight, and more preferably 0.3 to 5 parts by weight in terms of a solid content based on 100 parts by weight of the electrode active material, from the viewpoint that the moldability of an electrode is favorable and the viewpoint that the performance of the resulting electrochemical device is favorable.

(Electroconductive Agent)

Granulated particles for an electrochemical device of the present invention may contain an electroconductive agent in addition to the above-described electrode active material and particulate binder. As the electroconductive agent, it may be a particulate material having electroconductivity, and carbon black such as furnace black, acetylene black, and Ketjen black (registered trademark of Akzo Nobel Chemicals International B.V.) are preferably used. Among them, acetylene black is more preferred. The average particle diameter of the electroconductive agent is not particularly limited, however, preferably smaller than the average particle diameter of the electrode active material, and preferably 0.001 to 10 μm, more preferably 0.005 to 5 μm, and furthermore preferably 0.01 to 1 μm, from the viewpoint of exhibiting sufficient electroconductivity with a smaller use amount.

The content ratio of the electroconductive agent in a case where an electroconductive agent is added is preferably 0 to 15 parts by weight, more preferably 0 to 10 parts by weight, furthermore preferably 0.5 to 8 parts by weight based on 100 parts by weight of the electrode active material. When the content ratio of the electroconductive agent is too large, granulation cannot be performed.

(Granulator)

A step of obtaining a mixture, a kneading step, a crushing step, and a drying step of the present invention are preferably performed by using a granulator shown in FIG. 1. Note that, FIG. 1 is a schematic diagram showing a main part of a granulator. The granulator 2 is provided with a container 4 in which a kneading material is stored, kneaded, crushed, and granulated, a kneading blade 6 that has a shape corresponding to the inner wall surface of the container 4, and performs the stirring, mixing, and kneading of the kneading material, a crushing blade 8 that shears the kneading material, and a scraper 10 that scraps the kneading material stuck on the inner wall surface of the container 4.

Here, the kneading blade 6 and the crushing blade 8 perform planetary motion in which each of the blades revolves while rotating. Further, the granulator 2 is provided with a heater, which is not illustrated, to heat the inside of the container 4, and a pump, which is not illustrated, to decompress the inside or make the inside vacuum. Furthermore, the granulator 2 is usually sealed, and used.

In the present invention, a mixture containing the electrode active material, a particulate binder, and an electroconductive agent used as needed is used as a kneading material in the container 4.

Note that, in the present specification, a step of obtaining a mixture, a kneading step, a crushing step, and a drying step will be explained as a constitution performed by using the granulator 2, however, at least one of the steps may be performed by another device.

(Step of Obtaining Mixture)

In a step of obtaining a mixture, a mixture is obtained by adding a particulate binder dispersion, which has a solid content concentration of 20 to 60% by weight, preferably 20 to 55% by weight, and more preferably 25 to 55% by weight, in an amount of 0.3 to 10 parts by weight, preferably 0.3 to 8 parts by weight, and more preferably 0.3 to 5 parts by weight in terms of a solid content to 100 parts by weight of the electrode active material. Further, the mixture obtained in the step of obtaining a mixture may contain an electroconductive agent.

Here, in the step of obtaining a mixture, it is preferred that a particulate binder dispersion is sprayed on an electrode active material, and an electroconductive agent used as needed. Further, in the step of obtaining a mixture, a dispersion medium may further be added. Here, as the dispersion medium, any one of water and an organic solvent can be used, however, water is preferably used.

Furthermore, it is preferred that the step of obtaining a mixture is performed in the container 4 of the granulator 2 shown in FIG. 1.

(Kneading Step)

In a kneading step of the present invention, a uniformly dispersed mixture can be obtained by stirring a mixture containing the electrode active material, the particulate binder dispersion, the electroconductive agent used as needed by a kneading blade 6.

Here, in the kneading step, for example, a uniformly dispersed mixture can be obtained by taking a powdery electrode active material and an electroconductive agent used as needed into a particulate binder dispersion, so that making the state that the powdery electrode active material and the electroconductive agent are hardly present.

For example, the kneading step can be performed by rotating (see arrow A) and revolving (see arrow C) the kneading blade 6 of the granulator 2 shown in FIG. 1. The kneading blade 6 moves along the inner wall surface of the container 4, and rotates while revolving in the container 4.

Here, the revolution speed and rotation speed of the kneading blade 6 can be independently adjusted, and further, the rotation direction can be set to the normal rotation or reverse rotation to the revolution direction. The above-described rotation speed of the kneading blade 6 means the rotational speed of the kneading blade 6. The strength of kneading action to the mixture in the kneading step can be adjusted by the revolution track, revolution speed, rotation speed, shape of the kneading blade 6, and the like. For example, in a case where the kneading blade 6 rotates keeping the slight clearance to the inner wall surface while the revolution track of the kneading blade 6 draws a track along the circumference of the inner wall surface of the container 4, the kneading action can be strengthened by the shear force generated between the kneading blade 6 and the inner wall surface in addition to the stirring force of the kneading blade 6 itself. Further, the strength of kneading action can be adjusted by adjusting the clearance. In addition, the kneading action can be strengthened by setting the shape of the kneading blade 6 such that the kneading material (mixture) is pressed against the inner wall surface of the container 4 as much as possible.

Figure 2:
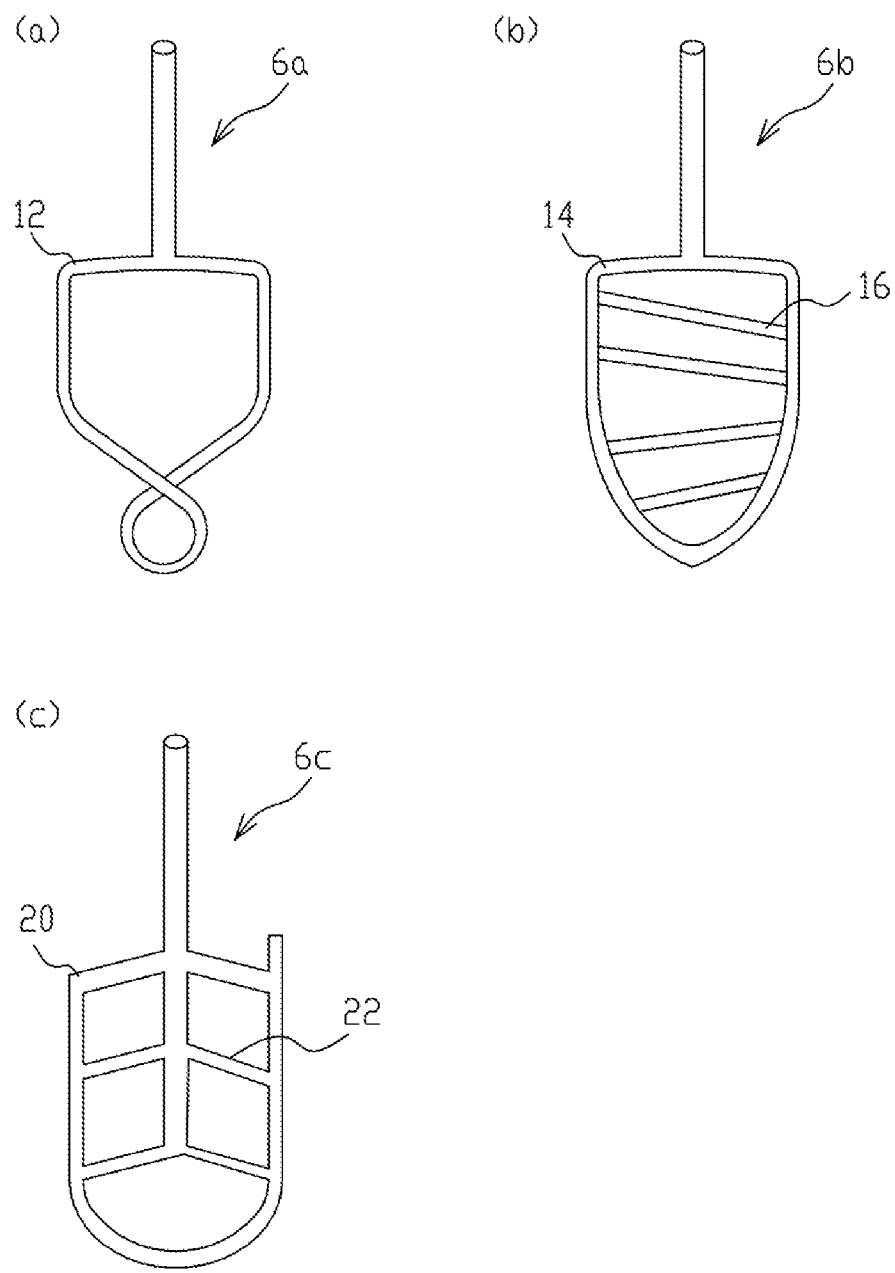
FIG. 2 is a drawing showing a shape of a stirring blade of a granulator used in the present invention.

As the shape of the kneading blade 6, for example, the one shown in FIGS. 2(*a*) to 2(*c*) can be used. The kneading blade 6*a* shown in FIG. 2(*a*) has a shape that the distal end of the outer member 12 is twisted. Further, the kneading blade 6*b* shown in FIG. 2(*b*) is configured by installing multiple transverse members 16 in the outer member 14. Furthermore, the appearance formed by the outer member 14 of the kneading blade 6*b* has a shape of a pointed distal end. Moreover, the outer member 14 has a shape of being twisted. In addition, the kneading blade 6*c* shown in FIG. 2(*c*) has multiple inclined members 22 that are inclined downwardly from the center of the outer member 20 having an oval shape.

Note that, when the kneading step is performed by using the granulator 2, the kneading material (mixture) stuck on the inner wall surface of the container 4 may be scrapped by revolving (see arrow C) the scraper 10.

Further, the temperature (kneading temperature) at the time of stirring by using the kneading blade 6 is preferably 0 to 100° C., more preferably 0 to 95° C., and furthermore preferably 5 to 95° C., from the viewpoint of making the uniformity of the uniformly dispersed mixture sufficient. When the kneading temperature is too high or too low, uniformity of the uniformly dispersed mixture cannot be sufficient.

Further, the energy (kneading energy) at the time of stirring by using the kneading blade 6 is preferably 50 to 200 MJ/m$^3$, more preferably 70 to 200 MJ/m$^3$, and furthermore preferably 70 to 180 MJ/m$^3$, from the viewpoint of making the uniformity of the uniformly dispersed mixture sufficient. When the kneading energy is too large, the electrode active material may be broken. Further, when the kneading energy is too small, uniformity of the uniformly dispersed mixture cannot be sufficient.

Note that, in the step of obtaining a uniformly dispersed mixture, a dispersion medium may further be added. Here, as the dispersion medium, any one of water and an organic solvent can be used, however, water is preferably used.

(Crushing Step)

In a crushing step of the present invention, the uniformly dispersed mixture obtained in the kneading step is crushed by a crushing blade 8 to obtain granulated particles. For example, the crushing step can be performed by rotating (see arrow B) and revolving (see arrow C) the crushing blade 8 of the granulator 2 shown in FIG. 1. Here, it is preferred that the crushing blade 8 is rotated at a high speed. Further, the revolution speed and rotation speed of the crushing blade 8 can be independently adjusted. Furthermore, the rotation direction can be set to the normal rotation or reverse rotation to the revolution direction. Further, the rotation speed means the rotational speed of the crushing blade 8.

The crushing blade 8 has a center axis 24 and multiple parallel blades 26 that have an edge shearing a uniformly dispersed mixture and are perpendicular to the axis direction on the center axis 24. Note that, the edge shape of the parallel blade 26 can be changed into various shapes depending on the shearing force.

Note that, when the crushing step is performed by using the granulator 2, the uniformly dispersed mixture stuck on the inner wall surface of the container 4 may be scrapped by revolving (see arrow C) the scraper 10.

The crushing temperature when the crushing is performed by a crushing blade 8 is preferably 0 to 100° C., and more preferably 5 to 100° C., from the viewpoint of obtaining uniform granulated particles. When the crushing temperature is too high or too low, uniform granulated particles cannot be obtained.

Further, the crushing energy when the crushing is performed by a crushing blade 8 is preferably 5 to 200 MJ/m$^3$, more preferably 10 to 200 MJ/m$^3$, and furthermore preferably 15 to 180 MJ/m$^3$, from the viewpoint of obtaining uniform granulated particles. When the crushing energy is too large, uniformity of the granulated particles cannot be sufficient. Furthermore, when the crushing energy is too small, the granulated particles may be broken.

Note that, each of the kneading step and the crushing step is not independently performed with time such that, for example, the kneading step is completed, and then the crushing step is performed, but a case where the two steps consisting of the kneading step and the crushing step simultaneously progress at least partially is also included. For example, a case where at least part of the crushing step also starts the progress in the process of performing the kneading step, a case where at least part of the kneading step is still proceeding in the process of performing the crushing step, and the like are also included. In the present embodiment, the crushing step is not performed after the completion of the kneading step, but a case where each of the steps simultaneously progresses is also included.

However, even in a case where both steps simultaneously progress, it is preferred that a uniformly dispersed mixture obtained in the kneading step is crushed in the crushing step.

(Drying Step)

In a drying step of the present invention, granulated particles obtained in the crushing step are dried, and granulated particles for an electrochemical device are obtained. The drying temperature is preferably 10 to 100° C., and more preferably 15 to 100° C., from the viewpoint of obtaining uniform granulated particles. When the drying temperature is too high, the particulate binder is degraded. Further, when the drying temperature is too low, the granulated particles cannot be dried.

Further, the drying time is preferably 10 seconds to 1 hour, more preferably 20 seconds to 50 minutes, and furthermore preferably 30 seconds to 40 minutes, from the viewpoint of obtaining uniform granulated particles. When the drying time is too long, the particulate binder is degraded. Further, when the drying time is too short, the granulated particles cannot be dried.

Further, in the drying step, it is preferred that the drying is performed by heating under reduced pressure. Note that, the drying step can be performed by heating the inside of the container 4 under reduced pressure by using the heater and the pump of the granulator 2 shown in FIG. 1. Furthermore, in a post-process of the drying step, the drying may further be performed by a drying device different from the container 4.

(Granulated Particles for an Electrochemical Device)

The volume average particle diameter D50 of the granulated particles for an electrochemical device obtained through the above-described step of obtaining a mixture, kneading step, crushing step, and drying step is preferably 10 to 350 μm, more preferably 10 to 300 μm, and furthermore preferably 10 to 280 μm. Further, the shape of the granulated particles for an electrochemical device is preferably an almost spherical shape.

(Electrode for an Electrochemical Device)

An electrode for an electrochemical device is obtained by laminating an electrode active material layer on a current collector. The electrode active material layer may be obtained by molding an electrode material containing granulated particles for an electrochemical device into a sheet, and then by laminating it on a current collector, however, it is preferred that an electrode material containing granulated particles for an electrochemical device is directly molded on a current collector to form an electrode active material layer. As a method for forming an electrode active material layer composed of an electrode material, there are a dry molding method such as a pressure molding method, and a wet molding method such as an applying method, however, a dry molding method is preferred, which does not require a drying step and is capable of producing an electrode with high productivity, and easily molds a thick active material layer uniformly. As the dry molding method, there are a pressure molding method, an extrusion molding method (also referred to as paste extrusion), and the like. The pressure molding method is a method in which an electrode material is pressurized to be rearranged and deformed to perform densification, and then an electrode active material layer is molded. The extrusion molding method is a method in which an electrode material is extruded by an extruder to be molded into a film, a sheet, or the like, and a method in which an electrode active material layer can continuously be molded as a long object. Among them, pressure molding is preferably used because it can be performed with a simplified equipment. Examples of the pressure molding method include, for example, a roll pressure molding method in which an electrode material containing granulated particles for an electrochemical device is supplied to a roll type pressure molding apparatus by a feeder such as a screw feeder to mold the electrode active material layer, a method in which an electrode material is sprayed onto a current collector, the electrode material is leveled with a blade or the like to adjust the thickness, and then the resultant is molded by a pressure apparatus, and a method in which an electrode material is filled into a mold, and the mold is pressurized for molding.

Among these pressure molding, a roll pressure molding is preferable. In this method, an electrode active material layer may directly be laminated on a current collector by feeding a current collector into rolls at the same time as an electrode material is supplied. The temperature at the time of molding is preferably 0 to 200° C., from the viewpoint of making the adhesiveness between the electrode active material layer and the current collector sufficient, and more preferably a temperature 10° C. or more higher than the glass transition temperature of the particulate binder contained in the granulated particles for an electrochemical device. The roll pressure molding is performed by setting the molding speed to preferably 0.1 to 40 m/minute, and more preferably 1 to 40 m/minute, from the viewpoint of improving the uniformity of the thickness of the electrode active material layer. Further, it is performed by setting the press linear pressure between rolls to preferably 0.2 to 30 kN/cm, and more preferably 0.5 to 10 kN/cm.

In order to eliminate the variation in the thickness of the molded electrode, and to increase the capacity by increasing the density of the electrode active material layer, a post-pressure may further be applied as needed. A method of the post-pressure is generally a press process by rolls. In the roll press process, two cylindrical rolls are vertically arranged in parallel with a narrow gap and are rotated in opposite directions to each other, and an electrode is pinched between the rolls and pressurized. Further, the rolls may be used by controlling the temperature such as heating, cooling, or the like.

(Electrochemical Device)

An electrochemical device can be obtained by using the above-described electrode for an electrochemical device at least for a negative electrode or a positive electrode. Examples of the electrochemical device include a power storage device such as a lithium ion secondary battery, an electric double-layered capacitor and a lithium ion capacitor, and a lithium ion secondary battery, an electric double-layered capacitor and a lithium ion capacitor, which are excellent in the energy density and the output density, are preferred.

Examples of the constituent element other than the electrode for an electrochemical device include a separator, and an electrolytic solution.

(Separator)

A separator is not particularly limited as long as being capable of insulating between the electrodes for an electrochemical device, and of passing positive ions and negative ions therethrough. Specifically, a microporous membrane or nonwoven fabric made of polyolefin such as polyethylene or polypropylene, aromatic polyamide, rayon, or glass fiber; a porous membrane that is generally called as an electrolytic capacitor paper made from pulp as a main raw material; a porous resin coat containing an inorganic ceramic powder; or the like can be used. The separator is arranged between electrodes for an electrochemical device such that each of a pair of the electrode active material layers is opposed to each other, and a device is obtained. The thickness of the separator is appropriately selected depending on the intended purpose for use, and preferably 1 to 100 μm, more preferably 10 to 80 μm, and furthermore preferably 20 to 60 μm.

(Electrolytic Solution)

In an electrolytic solution, an electrolyte is dissolved in an electrolyte solvent. In a case of a lithium ion secondary battery or a lithium ion capacitor, as the electrolyte solvent, for example, an aprotic polar solvent can be used. The aprotic polar solvent forms an aprotic organic electrolyte solution. Examples of the aprotic polar solvent include, for example, ethylene carbonate, propylene carbonate, dimethyl carbonate, diethyl carbonate, ethyl methyl carbonate, γ-butyrolactone, acetonitrile, dimethoxyethane, tetrahydrofuran, dioxolane, methylene chloride, dimethyl sulfonate, and sulfolane. In addition, a mixture in which two or more kinds of these aprotic polar solvents may be used. In a case where graphite is used as an active material of a negative electrode, ethylene carbonate is preferably contained.

The electrolyte to be dissolved in an electrolytic solution essentially contains an electrolyte that can generate lithium ions. For example, examples of the electrolyte include $LiClO_4$, $LiAsF_6$, $LiBF_4$, $LiPF_6$, $LiN(SO_2CF_3)_2$, $LiN(SO_2C_2F_5)_2$, $LiBC_4O_8$, and $LiCF_3SO_3$. Further, the electrolyte may be used alone, or as a mixture thereof. Note that, as mentioned in the above, as long as an electrolyte that can generate lithium ions is contained in an electrolytic solution, an electrolyte in which a cation becomes a quaternary ammonium cation or a spiro-(1,1')-bipyrrolidinium cation may be contained in an electrolytic solution to the extent that an adverse effect is not exerted on the characteristics.

In addition, as an additive for improving the characteristics, various kinds of additives such as vinylene carbonate, fluoroethylene carbonate, ethylene sulfite, methyl acetate, and vinyl acetate may be added into the electrolytic solution. Further, a flame-retarding additive such as PHOSLYTE (manufactured by NIPPON CHEMICAL INDUSTRIAL CO., LTD.), or the like may be added.

An electrochemical device is obtained by impregnating the electrode and separator with an electrolytic solution. Specifically, the electrode and separator are wound, laminated, folded or the like as needed to be placed in a container, an electrolytic solution is poured into the container, and the container is sealed to produce an electrochemical device. Further, the one in which the electrode and separator have been impregnated with an electrolytic solution may be stored in a container. As the container, any known one such as a coin type, a cylinder type, a square type, and the like can be used.

By the method for producing granulated particles for an electrochemical device according to the present embodiment, granulated particles, which are uniform, and excellent in the moldability of an electrode, can be obtained.

EXAMPLES

Hereinafter, the present invention will be described in more detail by indicating of Examples, but should not be limited at all by these Examples. In addition, the "parts" and "%" in the present Examples are on a weight basis unless otherwise noted.

Each of the measurements was performed in the manner described below in Examples and Comparative Examples.
(1) Particle Size Distribution of Granulated Particles for Electrochemical Device The particle size distribution of the granulated particles for an electrochemical device obtained in Examples and Comparative Examples was measured by a dry method using Microtrac (manufactured by NIKKISO CO., LTD.), and the evaluation was performed according to the following criteria. The results are shown in Table 1 and Table 2.

A: particle size distribution is extremely sharp (the ratio of the half value width to the length of peak bottom is less than 0.25)
B: particle size distribution is slightly sharp (the ratio of the half value width to the length of peak bottom is 0.25 or more to less than 0.35)
C: particle size distribution is slightly broad (the ratio of the half value width to the length of peak bottom is 0.35 or more to less than 0.50)
D: particle size distribution is extremely broad (the ratio of the half value width to the length of peak bottom is 0.50 or more)
(2) Uniformity of Granulated Particles for Electrochemical Device The granulated particles for an electrochemical device obtained in Examples and Comparative Example were sprayed onto a carbon tape, a cellophane tape was stuck on the particle-sprayed carbon tape. Then the granulated particles were divided by peeling the cellophane tape, the cross section of the granulated particles having a circular cross section broken finely in half was observed by a SEM (scanning electron microscope), and the uneven distribution of the electrode active material and the electroconductive agent were visually determined. The evaluation was performed according to the following criteria, and the results were shown in Table 1 and Table 2.
A: substantially no uneven distribution (substantially no uneven distribution of the electroconductive agent in the areas of the inside and the outside from the midpoint of the radius)
B: the electroconductive agent is slightly more observed on the surface (more largely present in the outside although present in the inside from the midpoint of the radius)
C: the electroconductive agent is unevenly distributed on the surface (almost no electroconductive agent in the inside from the midpoint of the radius, and substantially all the electroconductive agent is present on the outer periphery)
(3) Continuous Length Moldability The granulated particles for an electrochemical device obtained in Examples and Comparative Examples were roll-molded on an edged foil, and the continuous length moldability was confirmed. The evaluation was performed according to the following criteria, and the results were shown in Table 1 and Table 2.
A: moldable over 10 m or more without having any defects
B: moldable over 10 m, but some defects were observed
C: fluidity is poor, and 5 m cannot be molded
D: fluidity is poor, and 1 m cannot be molded
(4) Battery Characteristics: Output Characteristics The lithium ion secondary battery obtained in Examples and Comparative Examples was charged up to 4.2 V by a constant current method at a charge rate of 0.2 C under the environment of 25° C., then discharged to 3.0 V at a discharge rate of 0.2 C, and then the battery capacity was determined at the time of 0.2 C discharging. Next, the battery was charged to 4.2 V by a constant current method at a charge rate of 0.2 C, then discharged to 3.0 V at a discharge rate of 2 C, and then the battery capacity was determined at the time of 2 C discharging. Further, the same measurement was performed to ten lithium ion secondary batteries, and the average value of battery capacity at the time of 0.2 C discharging, and the average value of battery capacity at the time of 2 C discharging were calculated, and then the capacity retention rate at the time of 2 C discharging, which is a ratio of the average battery capacity Cap0.2 C at the time of 0.2 C discharging to the average battery capacity Cap2 C at the time of 2 C discharging ((Cap2

C/Cap0.2 C)×100%), was calculated. Furthermore, based on the obtained capacity retention rate at the time of 2 C discharging, the output characteristics were evaluated by the following criteria. The results are shown in Table 1 and Table 2. Note that, the higher the capacity retention rate at the time of 2 C discharging, the higher the discharge capacity at the time of high rate (2 C) discharging, and it can be determined that the output characteristics are excellent.
A: the capacity retention rate at the time of 2 C discharging is 90% or more
B: the capacity retention rate at the time of 2 C discharging is 75% or more to less than 90%
C: the capacity retention rate at the time of 2 C discharging is 60% or more to less than 75%
D: the capacity retention rate at the time of 2 C discharging is 50% or more to less than 60%
E: the capacity retention rate at the time of 2 C discharging is less than 50%

Example 1

Production of Granulated Particles for Electrochemical Device for Negative Electrode 100 parts of artificial graphite as an electrode active material (negative electrode active material), and 1 part of acetylene black ("HS-100" manufactured by DENKI KAGAKU KOGYO KABUSHIKI KAISHA) as an electroconductive agent were charged into a granulator 2 (high speed kneading granulator Triple Master TGM-1 (manufactured by SHINAGAWA MACHINERY WORKS Co., Ltd), see FIG. 1), and dry-blending was performed for ten minutes. Next, 1 part of latex BM-400B (styrene-butadiene copolymer) (manufactured by ZEON CORPORATION) having a solid content concentration of 40% in terms of a solid content was charged as a particulate binder dispersion by spraying into a mixture of the negative electrode active material and the electroconductive agent. After charging the particulate binder dispersion, a kneading step was performed by moving a kneading blade 6 at a revolution speed of 100 rpm and a rotation speed of 1500 rpm for three minutes in order to uniformly disperse the mixture. At this time, the kneading temperature was 40° C., and the kneading energy was 90 MJ/m$^3$. After that, a crushing step was performed by moving a crushing blade 8 at a rotation speed of 3000 rpm for two more minutes. At this time, the crushing temperature was 40° C., and the crushing energy was 70 MJ/m$^3$. After that, the resultant mixture was dried under reduced pressure at 50° C. for 30 minutes, and granulated particles for an electrochemical device for a negative electrode were obtained. The volume average particle diameter D50 of the obtained granulated particles for an electrochemical device for a negative electrode was 70 μm.

Note that, as the kneading blade 6, a kneading blade 6b shown in FIG. 2(b) was used. Further, a scraper 10 was revolved in the kneading step and the crushing step. Furthermore, 10 parts of ion exchanged water was added in the kneading step and the crushing step.

(Production of Negative Electrode)

The granulated particles for an electrochemical device for a negative electrode obtained in the above were supplied between rolls (at a roll temperature of 100° C. and a press linear pressure of 4.0 kN/cm) of a roll press machine (press-cutting rough surface heat roll, manufactured by HIRANO GIKEN KOGYO Co., Ltd.) together with an electrolytic copper foil (thickness: 20 μm) as a current collector, and molded into a sheet on the electrolytic copper foil as a current collector at a molding speed of 20 m/minute, and a negative electrode active material layer having a thickness of 80 μm was obtained.

(Production of Slurry for Positive Electrode and Positive Electrode)

2 parts of polyvinylidene fluoride (PVDF: "KF-1100" manufactured by KUREHA CORPORATION) in terms of a solid content were added as a binder for a positive electrode into 100 parts of lithium cobaltate (LiCoO$_2$: hereinafter, may be abbreviated as "LCO") as a positive electrode active material, and further, 6 parts of acetylene black ("HS-100" manufactured by DENKI KAGAKU KOGYO KABUSHIKI KAISHA) and 20 parts of N-methyl pyrrolidone were added, and the resultant mixture was mixed by a planetary mixer to obtain a slurry for a positive electrode. This slurry for a positive electrode was applied onto an aluminum foil having a thickness of 18 μm, dried at 120° C. for 30 minutes, and then the applied foil was pressed by rolls to obtain a positive electrode having a thickness of 60 μm.

(Preparation for Separator)

A single layer of a separator made of polypropylene ("Celgard 2500" manufactured by Celgard, LLC.) was cut out into a square of 5×5 cm$^2$, and a separator was prepared.

(Production of Lithium Ion Secondary Battery)

As the exterior of a battery, an aluminum packaging material exterior was prepared. Further, the positive electrode was cut out into a square of 4×4 cm$^2$, and the cut-out positive electrode was arranged so that the surface on the side of a current collector is brought into contact with the aluminum packaging material exterior. Next, the square separator was arranged on the surface of a positive electrode active material layer of a positive electrode. Furthermore, a negative electrode after pressing was cut out into a square of 4.2×4.2 cm$^2$, and the cut-out negative electrode was arranged on the separator so that the surface on the side of the negative electrode active material layer faces the separator. An electrolytic solution (solvent: ethylene carbonate/diethyl carbonate/vinylene carbonate=68.5/30/1.5 volume ratio, and electrolyte: LiPF$_6$ having a concentration of 1 M) was poured into the aluminum packaging material, so as not to leave air. In addition, in order to seal the opening of the aluminum packaging material, the aluminum packaging material exterior was closed by heat sealing at 150° C., and a lithium ion secondary battery was produced. The output characteristics of the obtained lithium ion secondary battery were measured.

Example 2

Production of Granulated Particles for Electrochemical Device for Positive Electrode 100 parts of lithium cobaltate (LCO)-based positive electrode active material as an electrode active material (positive electrode active material), 4.0 parts of acetylene black ("HS-100" manufactured by DENKI KAGAKU KOGYO KABUSHIKI KAISHA) as an electroconductive agent, were charged into a granulator 2 (high speed kneading granulator, Triple Master TGM-1 (manufactured by SHINAGAWA MACHINERY WORKS Co., Ltd), see FIG. 1), and dry-blending was performed for ten minutes. Next, 1 part of latex BM-610B (acrylate-based polymer) (manufactured by ZEON CORPORATION) having a solid content concentration of 40% in terms of a solid content was charged as a particulate binder dispersion by spraying into a mixture of the positive electrode active material and the electroconductive agent. After charging the particulate binder dispersion, a kneading step was performed by moving a kneading blade 6 at a revolution speed of 100 rpm and a rotation speed of 1500 rpm for three minutes in order to uniformly disperse the mixture. At this time, the kneading temperature was 40° C., and the kneading energy was 90 MJ/m³. After that, a crushing step was performed by moving a crushing blade 8 at a rotation speed of 3000 rpm for two more minutes. At this time, the crushing temperature was 40° C., and the crushing energy was 70 MJ/m³. After that, the resultant mixture was dried under reduced pressure at 50° C. for 30 minutes, and granulated particles for an electrochemical device for a positive electrode were obtained. The volume average particle diameter D50 of the obtained granulated particles for an electrochemical device for a positive electrode was 40 μm.

Note that, as the kneading blade 6, a kneading blade 6b shown in FIG. 2(b) was used. Further, a scraper 10 was revolved in the kneading step and the crushing step.

(Production of Positive Electrode)

The granulated particles for an electrochemical device for a positive electrode obtained in the above were supplied between rolls for press (at a roll temperature of 100° C. and a press linear pressure of 500 kN/m) of a roll press machine ("press-cutting rough surface heat roll" manufactured by HIRANO GIKEN KOGYO Co., Ltd.) by using a constant feeder ("Nikka spray K-V" manufactured by NIKKA LIMITED). An aluminum foil having a thickness of 20 μm was inserted between rolls for press, the granulated particles for an electrochemical device for a positive electrode, which had been supplied from the constant feeder, were stuck on an aluminum foil (current collector), and were subjected to pressure molding at a molding speed of 1.5 m/minute, and a positive electrode having a positive electrode active material was obtained.

(Production of Binder for Negative Electrode)

47 parts of styrene, 50 parts of 1,3-butadiene, 3 parts of methacrylic acid, 4 parts of sodium dodecylbenzenesulfonate, 150 parts of ion exchanged water, 0.4 parts of t-dodecyl mercaptan as a chain transfer agent, and 0.5 parts of potassium persulfate as a polymerization initiator were placed into a 5 MPa pressure container with a stirrer, and stirred thoroughly, and then the resultant mixture was heated to 50° C. to start the polymerization. The reaction was terminated by cooling when a polymerization conversion rate became 96%, and a particulate binder resin for a negative electrode (styrene-butadiene copolymer, hereinafter, may be abbreviated as "SBR") was obtained.

(Production of Slurry for Negative Electrode and Negative Electrode)

100 parts of artificial graphite (the average particle diameter: 24.5 μm) having a specific surface area of 4 m²/g as a negative electrode active material, 0.7 parts of 1% aqueous solution of carboxymethyl cellulose ("BSH-12" manufactured by DKS Co. Ltd.) in terms of a solid content as a dispersing agent, and 1.0 part of SBR in terms of a solid content, were added into a planetary mixer with a disperser, and mixed by adjusting the resultant mixture with ion exchanged water so that the total solid content concentration was 50%. The resultant mixture was subjected to a defoaming treatment under reduced pressure and a slurry for a negative electrode was obtained.

The slurry for a negative electrode obtained in the above was applied by using a comma coater onto a copper foil having a thickness of 20 μm so that the film thickness after drying was around 150 μm, and dried. The drying was performed by transporting the copper foil at a speed of 0.5 m/minute for two minutes in an oven at 60° C. After that, the resultant was subjected to a heat treatment at 120° C. for two minutes, and a negative electrode raw material was obtained. The negative electrode raw material was rolled by a roll press, and a negative electrode having a negative electrode active material layer was obtained.

(Preparation for Separator)

A single layer of separator made of polypropylene ("Celgard 2500" manufactured by Celgard, LLC.) was cut out into a square of 5×5 cm², and a separator was prepared.

(Production of Lithium Ion Secondary Battery)

As the exterior of a battery, an aluminum packaging material exterior was prepared. Further, the positive electrode was cut out into a square of 4×4 cm², and the cut-out positive electrode was arranged so that the surface on the side of a current collector is brought into contact with the aluminum packaging material exterior. Next, the square separator was arranged on the surface of a positive electrode active material layer of a positive electrode. Furthermore, a negative electrode after pressing was cut out into a square of 4.2×4.2 cm², and the cut-out negative electrode was arranged on the separator so that the surface on the side of the negative electrode active material layer faces the separator. An electrolytic solution (solvent: ethylene carbonate/diethyl carbonate/vinylene carbonate=68.5/30/1.5 volume ratio, and electrolyte: $LiPF_6$ having a concentration of 1 M) was poured into the aluminum packaging material, so as not to leave air. In addition, in order to seal the opening of the aluminum packaging material, the aluminum packaging material exterior was closed by heat sealing at 150° C., and a lithium ion secondary battery was produced. The output characteristics of the obtained lithium ion secondary battery were measured.

Example 3

Production of granulated particles for an electrochemical device for a negative electrode, production of a negative electrode, and production of a lithium ion secondary battery were performed in the same manner as in Example 1 except that the solid content concentration of the particulate binder dispersion was set to 25%.

Example 4

Production of granulated particles for an electrochemical device for a negative electrode, production of a negative electrode, and production of a lithium ion secondary battery were performed in the same manner as in Example 1 except that the solid content concentration of the particulate binder dispersion was set to 50%.

Example 5

Production of granulated particles for an electrochemical device for a negative electrode, production of a negative electrode, and production of a lithium ion secondary battery were performed in the same manner as in Example 1 except that the rotation speed of the kneading blade 6, and the rotation speed and operation time of the crushing blade 8 were changed. At this time, the kneading temperature was 40° C., and the kneading energy was 60 MJ/m³. Further, the crushing temperature was 40° C., and the crushing energy was 20 MJ/m³.

Example 6

Production of granulated particles for an electrochemical device for a negative electrode, production of a negative electrode, and production of a lithium ion secondary battery were performed in the same manner as in Example 1 except that the rotation speed of the kneading blade 6, and the rotation speed and operation time of the crushing blade 8 were changed. At this time, the kneading temperature was 40° C., and the kneading energy was 170 MJ/m$^3$. Further, the crushing temperature was 50° C., and the crushing energy was 170 MJ/m$^3$.

Example 7

Production of granulated particles for an electrochemical device for a negative electrode, production of a negative electrode, and production of a lithium ion secondary battery were performed in the same manner as in Example 1 except that the shape of the kneading blade 6 to be used was set to the shape of the kneading blade 6c shown in FIG. 2(c).

Example 8

Production of granulated particles for an electrochemical device for a negative electrode, production of a negative electrode, and production of a lithium ion secondary battery were performed in the same manner as in Example 1 except that the shape of the kneading blade 6 to be used was set to the shape of the kneading blade 6a shown in FIG. 2(a).

Example 9

Production of granulated particles for an electrochemical device for a negative electrode, production of a negative electrode, and production of a lithium ion secondary battery were performed in the same manner as in Example 1 except that the drying using microwaves was performed in place of the drying under reduced pressure.

Example 10

Production of granulated particles for an electrochemical device for a negative electrode, production of a negative electrode, and production of a lithium ion secondary battery were performed in the same manner as in Example 1 except that the scraper 10 was not used in the kneading step and the crushing step.

Comparative Example 1

Production of granulated particles for an electrochemical device for a negative electrode, production of a negative electrode, and production of a lithium ion secondary battery were performed in the same manner as in Example 1 except that the solid content concentration of the particulate binder dispersion was set to 18%.

Comparative Example 2

Production of granulated particles for an electrochemical device for a negative electrode, production of a negative electrode, and production of a lithium ion secondary battery were performed in the same manner as in Example 1 except that the solid content concentration of the particulate binder dispersion was set to 65%.

Comparative Example 3

Production of granulated particles for an electrochemical device for a positive electrode, production of a positive electrode, and production of a lithium ion secondary battery were performed in the same manner as in Example 2 except that the amount of the particulate binder dispersion to be charged at the time of preparing granulated particles for a positive electrode was set to 0.2 parts in terms of a solid content.

Comparative Example 4

Production of granulated particles for an electrochemical device for a positive electrode, production of a positive electrode, and production of a lithium ion secondary battery were performed in the same manner as in Example 2 except that the amount of the particulate binder dispersion to be charged at the time of preparing granulated particles for a positive electrode was set to 12 parts in terms of a solid content.

Comparative Example 5

Production of granulated particles for an electrochemical device for a negative electrode, production of a negative electrode, and production of a lithium ion secondary battery were performed in the same manner as in Example 1 except that the rotation speed of the kneading blade 6 was changed. At this time, the kneading temperature was 40° C., and the kneading energy was 40 MJ/m$^3$. The uniformity of the uniformly dispersed mixture obtained by the kneading step was not sufficient.

Comparative Example 6

Production of granulated particles for an electrochemical device for a negative electrode, production of a negative electrode, and production of a lithium ion secondary battery were performed in the same manner as in Example 1 except that a crushing blade 6 was not used.

Comparative Example 7

100 parts of LCO-based positive electrode active material, 4 parts of acetylene black ("HS-100" manufactured by DENKI KAGAKU KOGYO KABUSHIKI KAISHA) as an electroconductive agent, 2 parts of latex BM-610B (manufactured by ZEON CORPORATION) having a solid content concentration of 40% in terms of a solid content as a particulate binder dispersion, and further, ion exchanged water in order to obtain a solid content concentration of 40%, were mixed and dispersed to obtain a slurry for composite particles. The slurry for composite particles was subjected to spray drying by using a spray dryer (manufactured by OHKAWARA KAKOHKI CO., LTD.), and composite particles were obtained. The volume average particle diameter of the composite particles was 40 μm.

Production of a positive electrode, and production of a lithium ion secondary battery were performed in the same manner as in Example 2 except that the composite particles prepared by spray drying were used in place of the granulated particles for an electrochemical device for a positive electrode.

Comparative Example 8

100 parts of natural graphite as an electrode active material (negative electrode active material), 1 part of acetylene black ("HS-100" manufactured by DENKI KAGAKU KOGYO KABUSHIKI KAISHA) as an electroconductive agent, and 1 part of latex BM-400B (manufactured by ZEON CORPORATION) having a solid content concentration of 40% in terms of a solid content as a particulate binder dispersion, were kneaded by using a Shinagawa-type universal mixer (manufactured by SHINAGAWA MACHINERY WORKS Co., Ltd), and a mixture was obtained. The mixture was dried at 100° C., and sized by a mesh with a mesh opening of 1200 μm. After that, pressure compression molding was performed by a hydraulic press using a predetermined molding mold, and a negative electrode was obtained.

Production of a lithium ion secondary battery was performed in the same manner as in Example 1 except for using the negative electrode obtained by the pressure compression molding.

Comparative Example 9

1 part of acetylene black ("HS-100" manufactured by DENKI KAGAKU KOGYO KABUSHIKI KAISHA) as an electroconductive agent, and 1 part of latex BM-400B (manufactured by ZEON CORPORATION) having a solid content concentration of 40% in terms of a solid content as a particulate binder dispersion, were mixed by a planetary mixer to obtain an electroconductive agent dispersion.

Next, 100 parts of natural graphite as an electrode active material (negative electrode active material) were supplied to a fluidized bed granulator (AGROMASTER manufactured by Hosokawa Micron Corporation), the electroconductive agent dispersion was sprayed by pressing over ten minutes in the air flow at 120° C., and mixed to obtain composite particles having a volume average particle diameter of 125 μm.

Production of a negative electrode, and production of a lithium ion secondary battery were performed in the same manner as in Example 1 except that the composite particles prepared by the fluidized bed granulator were used in place of the granulated particles for an electrochemical device for a negative electrode.

TABLE 1

| | | | Ex. 1 | Ex. 2 | Ex. 3 | Ex. 4 | Ex. 5 |
|---|---|---|---|---|---|---|---|
| Granulated particles for electrochemical device | Electrode active material | Type | Artificial graphite | LCO | Artificial graphite | Artificial graphite | Artificial graphite |
| | | Addition amount | 100 parts | 100 parts | 100 parts | 100 parts | 100 parts |
| | Particulate binder | Type | BM-400B | BM-610B | BM-400B | BM-400B | BM-400B |
| | | Addition amount (in terms of a solid content) | 1 part | 1 part | 1 part | 1 part | 1 part |
| | | Solid content concentration | 40% | 40% | 25% | 50% | 40% |
| | Electroconductive agent | Type | HS-100 | HS-100 | HS-100 | HS-100 | HS-100 |
| | | Addition amount | 1 part | 4 parts | 1 part | 1 part | 1 part |
| | Dispersion medium | Type | Water | None | Water | Water | Water |
| | | Addition amount | 10 parts | — | 10 parts | 10 parts | 10 parts |
| | | Volume average particle diameter | 70 μm | 40 μm | 70 μm | 70 μm | 70 μm |
| Kneading step | | Type of kneading blade | kneading blade 6b | kneading blade 6b | kneading blade 6b | kneading blade 6b | kneading blade 6b |
| | | Kneading temperature | 40° C. | 40° C. | 40° C. | 40° C. | 40° C. |
| | | Kneading energy | 90 MJ/m$^3$ | 90 MJ/m$^3$ | 90 MJ/m$^3$ | 90 MJ/m$^3$ | 60 MJ/m$^3$ |
| Crushing step | | Whether or not the use of crushing blade | Used | Used | Used | Used | Used |
| | | Crushing temperature | 40° C. | 40° C. | 40° C. | 40° C. | 40° C. |
| | | Crushing energy | 70 MJ/m$^3$ | 70 MJ/m$^3$ | 70 MJ/m$^3$ | 70 MJ/m$^3$ | 20 MJ/m$^3$ |
| Drying step | | Drying method | Heating under reduced pressure | Heating under reduced pressure | Heating under reduced pressure | Heating under reduced pressure | Heating under reduced pressure |
| | | Drying temperature | 50° C. | 50° C. | 50° C. | 50° C. | 50° C. |
| | | Drying time | 30 minutes | 30 minutes | 30 minutes | 30 minutes | 30 minutes |
| | | Whether or not the use of scraper | Used | Used | Used | Used | Used |
| Evaluation items | | Particle size distribution of granulated particles for electrochemical device | A | A | A | B | B |
| | | Uniformity of granulated particles for electrochemical device | A | A | B | B | A |
| | | Continuous length moldability | A | A | A | B | B |
| | | Output characteristics | A | A | A | A | B |

| | | | Ex. 6 | Ex. 7 | Ex. 8 | Ex. 9 | Ex. 10 |
|---|---|---|---|---|---|---|---|
| Granulated particles for electrochemical device | Electrode active material | Type | Artificial graphite | Artificial graphite | Artificial graphite | Artificial graphite | Artificial graphite |
| | | Addition amount | 100 parts | 100 parts | 100 parts | 100 parts | 100 parts |
| | Particulate binder | Type | BM-400B | BM-400B | BM-400B | BM-400B | BM-400B |
| | | Addition amount (in terms of a solid content) | 1 part | 1 part | 1 part | 1 part | 1 part |
| | | Solid content concentration | 40% | 40% | 40% | 40% | 40% |
| | Electroconductive agent | Type | HS-100 | HS-100 | HS-100 | HS-100 | HS-100 |
| | | Addition amount | 1 part | 1 part | 1 part | 1 part | 1 part |
| | Dispersion medium | Type | Water | Water | Water | Water | Water |
| | | Addition amount | 10 parts | 10 parts | 10 parts | 10 parts | 10 parts |
| | | Volume average particle diameter | 70 μm | 70 μm | 70 μm | 70 μm | 70 μm |

TABLE 1-continued

| | | | | | | |
|---|---|---|---|---|---|---|
| Kneading step | Type of kneading blade | kneading blade 6b | kneading blade 6c | kneading blade 6a | kneading blade 6b | kneading blade 6b |
| | Kneading temperature | 40° C. | 40° C. | 40° C. | 40° C. | 40° C. |
| | Kneading energy | 170 MJ/m$^3$ | 90 MJ/m$^3$ | 90 MJ/m$^3$ | 90 MJ/m$^3$ | 90 MJ/m$^3$ |
| Crushing step | Whether or not the use of crushing blade | Used | Used | Used | Used | Used |
| | Crushing temperature | 50° C. | 40° C. | 40° C. | 40° C. | 40° C. |
| | Crushing energy | 170 MJ/m$^3$ | 70 MJ/m$^3$ | 70 MJ/m$^3$ | 70 MJ/m$^3$ | 70 MJ/m$^3$ |
| Drying step | Drying method | Heating under reduced pressure | Heating under reduced pressure | Heating under reduced pressure | Microwaves | Heating under reduced pressure |
| | Drying temperature | 50° C. | 50° C. | 50° C. | 50° C. | 50° C. |
| | Drying time | 30 minutes | 30 minutes | 30 minutes | 30 minutes | 30 minutes |
| | Whether or not the use of scraper | Used | Used | Used | Used | None |
| Evaluation items | Particle size distribution of granulated particles for electrochemical device | B | B | B | A | B |
| | Uniformity of granulated particles for electrochemical device | A | A | A | A | A |
| | Continuous length moldability | B | A | B | A | B |
| | Output characteristics | B | A | B | A | A |

TABLE 2

| | | | Comp. Ex. 1 | Comp. Ex. 2 | Comp. Ex. 3 | Comp. Ex. 4 | Comp. Ex. 5 |
|---|---|---|---|---|---|---|---|
| Granulated particles for electrochemical device | Electrode active material | Type | Artificial graphite | Artificial graphite | LCO | LCO | Artificial graphite |
| | | Addition amount | 100 parts | 100 parts | 100 parts | 100 parts | 100 parts |
| | Particulate binder | Type | BM-400B | BM-400B | BM-610B | BM-610B | BM-400B |
| | | Addition amount (in terms of a solid content) | 1 part | 1 part | 0.2 parts | 12 parts | 1 part |
| | | Solid content concentration | 18% | 65% | 40% | 40% | 40% |
| | Electroconductive agent | Type | HS-100 | HS-100 | HS-100 | HS-100 | HS-100 |
| | | Addition amount | 1 part | 1 part | 4 parts | 4 parts | 1 part |
| | Dispersion medium | Type | Water | Water | None | None | Water |
| | | Addition amount | 10 parts | 10 parts | — | — | 10 parts |
| | Volume average particle diameter | | 70 μm | 70 μm | 40 μm | 40 μm | 70 μm |
| Kneading step | Type of kneading blade | | kneading blade 6b | kneading blade 6b | kneading blade 6b | kneading blade 6b | kneading blade 6b |
| | Kneading temperature | | 40° C. | 40° C. | 40° C. | 40° C. | 40° C. |
| | Kneading energy | | 90 MJ/m$^3$ | 90 MJ/m$^3$ | 90 MJ/m$^3$ | 90 MJ/m$^3$ | 40 MJ/m$^3$ |
| Crushing step | Whether or not the use of crushing blade | | Used | Used | Used | Used | Used |
| | Crushing temperature | | 40° C. | 40° C. | 40° C. | 40° C. | 40° C. |
| | Crushing energy | | 70 MJ/m$^3$ | 70 MJ/m$^3$ | 70 MJ/m$^3$ | 70 MJ/m$^3$ | 70 MJ/m$^3$ |
| Drying step | Drying method | | Heating under reduced pressure | Heating under reduced pressure | Heating under reduced pressure | Heating under reduced pressure | Heating under reduced pressure |
| | Drying temperature | | 50° C. | 50° C. | 50° C. | 50° C. | 50° C. |
| | Drying time | | 30 minutes | 30 minutes | 30 minutes | 30 minutes | 30 minutes |
| | Whether or not the use of scraper | | Used | Used | Used | Used | Used |
| Evaluation items | Particle size distribution of granulated particles for electrochemical device | | C | C | D | B | B |
| | Uniformity of granulated particles for electrochemical device | | B | B | B | B | B |
| | Continuous length moldability | | B | C | C | D | C |
| | Output characteristics | | C | D | D | E | C |

| | | | Comp. Ex. 6 | Comp. Ex. 7 | Comp. Ex. 8 | Comp. Ex. 9 |
|---|---|---|---|---|---|---|
| Granulated particles for electrochemical device | Electrode active material | Type | Artificial graphite | LCO | Natural graphite | Natural graphite |
| | | Addition amount | 100 parts | 100 parts | 100 parts | 100 parts |
| | Particulate binder | Type | BM-400B | BM-610B | BM-400B | BM-400B |
| | | Addition amount (in terms of a solid content) | 1 part | 2 parts | 1 part | 1 part |
| | | Solid content concentration | 40% | 40% | 40% | 40% |
| | Electroconductive agent | Type | HS-100 | HS-100 | HS-100 | HS-100 |
| | | Addition amount | 1 part | 4 parts | 1 part | 1 part |
| | Dispersion medium | Type | Water | Water | Water | Water |
| | | Addition amount | 10 parts | 10 parts | 10 parts | 10 parts |
| | Volume average particle diameter | | 70 μm | 40 μm | 30 μm | 125 μm |

TABLE 2-continued

| Kneading step | Type of kneading blade | kneading blade 6b | Granulation by spray drying 40° C. | Pressure compression molding | Granulation by fluidized bed granulation method |
|---|---|---|---|---|---|
| | Kneading temperature | | | | |
| | Kneading energy | 90 MJ/m$^3$ | | | |
| Crushing step | Whether or not the use of crushing blade | None | | | |
| | Crushing temperature | — | | | |
| | Crushing energy | — | | | |
| Drying step | Drying method | Heating under reduced pressure | | | |
| | Drying temperature | 50° C. | | | |
| | Drying time | 30 minutes | | | |
| | Whether or not the use of scraper | Used | | | |
| Evaluation items | Particle size distribution of granulated particles for electrochemical device | D | A | D | C |
| | Uniformity of granulated particles for electrochemical device | B | C | Not granulated | B |
| | Continuous length moldability | D | A | D | D |
| | Output characteristics | Unmeasurable | B | Unmeasurable | Unmeasurable |

As shown in Table 1 and Table 2, the particle size distribution, the uniformity of the granulated particles for an electrochemical device, and the continuous length moldability of the granulated particles for an electrochemical device, which were obtained by a production method including: a step of obtaining a mixture by adding 0.3 parts by weight to 10 parts by weight of a particulate binder dispersion, which has a solid content concentration of 20% by weight to 60% by weight in terms of a solid content, to 100 parts by weight of the electrode active material; a kneading step of stirring the mixture by a kneading blade to obtain a uniformly dispersed mixture; a crushing step of crushing the uniformly dispersed mixture by a crushing blade to obtain granulated particles; and a drying step of drying the granulated particles, were favorable, and the output characteristics of the lithium ion secondary battery obtained by using the granulated particles for an electrochemical device were favorable.

The invention claimed is:

1. A method for producing granulated particles for an electrochemical device, comprising:
    a step of obtaining a mixture by adding 0.3 to 5 parts by weight of a particulate binder dispersion by spraying, the particulate binder dispersion having a solid content concentration of 25% to 50% by weight in terms of a solid content, to 100 parts by weight of a lithium-containing metal oxide as an electrode active material comprising a dried powder;
    a kneading step of kneading the electrode active material into the particulate binder dispersion by stirring the mixture with a kneading blade at a kneading temperature of 5° C. to 95° C. and a kneading energy inputted to the mixture with the kneading blade of 70 to 200 MJ/m$^3$ to obtain a uniformly dispersed mixture;
    a crushing step of crushing the uniformly dispersed mixture with a crushing blade at a crushing temperature of 5 to 100° C. and a crushing energy inputted to the uniformly dispersed mixture with the crushing blade of 10 to 200 MJ/m$^3$ to obtain granulated particles; and
    a drying step of drying the granulated particles at a temperature range of 10° C. to 50° C.

2. The method for producing granulated particles for an electrochemical device according to claim 1, wherein
    a dispersion medium is added in at least one step selecting from the kneading step and the crushing step.

3. The method for producing granulated particles for an electrochemical device according to claim 1, wherein
    a granulator equipped with a kneading blade, a crushing blade, and a scraper is used in the crushing step.

4. The method for producing granulated particles for an electrochemical device according to claim 1, wherein
    a volume average particle diameter D50 of the granulated particles for an electrochemical device to be obtained is from 10 μm to 350 μm.

5. An electrode for an electrochemical device obtained by dry molding the granulated particles for an electrochemical device to be obtained by the method for producing granulated particles for an electrochemical device according to claim 1.

6. An electrochemical device, comprising the electrode for an electrochemical device according to claim 5.

7. The method for producing granulated particles for an electrochemical device according to claim 2, wherein
    a granulator equipped with a kneading blade, a crushing blade, and a scraper is used in the crushing step.

8. The method for producing granulated particles for an electrocchemical device according to claim 2, wherein
    a volume average particle diameter D50 of the granulated particles for an electrochemical device to be obtained is from 10 μm to 350 μm.

9. The method for producing granulated particles for an electrochemical device according to claim 3, wherein
    a volume average particle diameter D50 of the granulated particles for an electrochemical device to be obtained is from 10 μm to 350 μm.

10. An electrode for an electrochemical device obtained by dry molding the granulated particles for an electrochemical device to be obtained by the method for producing granulated particles for an electrochemical device according to claim 2.

11. An electrode for an electrochemical device obtained by dry molding the granulated particles for an electrochemical device to be obtained by the method for producing granulated particles for an electrochemical device according to claim 3.

12. An electrode for an electrochemical device obtained by dry molding the granulated particles for an electrochemical device to be obtained by the method for producing granulated particles for an electrochemical device according to claim 4.

* * * * *